United States Patent
Mentesana

(10) Patent No.: US 7,245,061 B2
(45) Date of Patent: Jul. 17, 2007

(54) MICRO-BEAM FRICTION LINER AND METHOD OF TRANSFERRING ENERGY

(75) Inventor: Charles Mentesana, Leawood, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 564 days.

(21) Appl. No.: 10/775,006

(22) Filed: Feb. 9, 2004

(65) Prior Publication Data

US 2004/0156752 A1    Aug. 12, 2004

Related U.S. Application Data

(62) Division of application No. 10/317,589, filed on Dec. 12, 2002, now abandoned.

(51) Int. Cl.
*H02N 2/00*    (2006.01)
(52) U.S. Cl. .............................. 310/323.09; 310/323.04
(58) Field of Classification Search ................................
310/323.01–323.06, 323.08, 323.09
See application file for complete search history.

(56) References Cited

U.S. PATENT DOCUMENTS

| | | | |
|---|---|---|---|
| 4,400,641 A * | 8/1983 | Vishnevsky et al. ... | 310/323.02 |
| 4,453,103 A | 6/1984 | Vishnevsky et al. | |
| 4,642,509 A | 2/1987 | Kumada | |
| 4,692,650 A * | 9/1987 | Okumura et al. ...... | 310/323.08 |
| 4,947,076 A | 8/1990 | Kumada | |
| 5,155,418 A * | 10/1992 | Kataoka .................... | 318/116 |
| 5,378,948 A | 1/1995 | Richter | |
| 5,402,030 A * | 3/1995 | Mukohjima ............ | 310/323.04 |
| 5,418,417 A * | 5/1995 | Luthier et al. ......... | 310/323.08 |
| 5,473,215 A * | 12/1995 | Luthier .................. | 310/323.06 |
| 5,479,380 A * | 12/1995 | Miyazawa et al. .......... | 368/157 |
| 5,819,888 A * | 10/1998 | Tamura et al. ........ | 188/218 XL |
| 5,917,270 A * | 6/1999 | Tsukimoto et al. .... | 310/323.12 |
| 5,949,178 A * | 9/1999 | Tamai et al. ........... | 310/323.01 |
| 6,320,299 B1* | 11/2001 | Kitani et al. ........... | 310/323.04 |
| 6,853,507 B2* | 2/2005 | Ryu et al. .................... | 359/824 |
| 2002/0074900 A1* | 6/2002 | Yoon et al. ............. | 310/323.06 |

FOREIGN PATENT DOCUMENTS

| | | | | |
|---|---|---|---|---|
| JP | 62-126872 | * | 6/1987 | ................. 310/311 |
| JP | 2005-261080 | * | 9/2005 | |

OTHER PUBLICATIONS

Sato et al., "Ultrasonic Motor Using a Large-Diameter Torsional Vibrator with Slant Slits", *Japanese Journal of Applied Physics, Part 1: Regular Papers & Short Notes & Review Papers* vol. 34 No. 5B pp. 2707-2710 (May 1995).

* cited by examiner

*Primary Examiner*—Thomas M. Dougherty
(74) *Attorney, Agent, or Firm*—Hovey Williams LLP

(57) ABSTRACT

A micro-beam friction liner adapted to increase performance and efficiency and reduce wear in a piezoelectric motor or actuator or other device using a traveling or standing wave to transfer energy in the form of torque and momentum. The micro-beam friction liner comprises a dense array of micro-beam projections having first ends fixed relative to a rotor and second ends projecting substantially toward a plurality of teeth of a stator, wherein the micro-beam projections are compressed and bent during piezoelectric movement of the stator teeth, thereby storing the energy, and then react against the stator teeth to convert the stored energy stored to rotational energy in the rotor.

12 Claims, 3 Drawing Sheets

MICRO-BEAM FRICTION LINER AND METHOD OF TRANSFERRING ENERGY

RELATED APPLICATION

This application is a divisional and claims priority benefit of U.S. patent application Ser. No. 10/317,589, filed Dec. 12, 2002 now abandoned, entitled MICRO-BEAM FRICTION LINER AND METHOD OF TRANSFERRING ENERGY, which is incorporated by reference.

FEDERALLY SPONSORED RESEARCH OR DEVELOPMENT PROGRAM

The present invention was developed with support from the U.S. government under Contract No. DE-AC04-01AL66850 with the U.S. Department of Energy. Accordingly, the U.S. government has certain rights in the present invention.

BACKGROUND OF THE INVENTION

1. Field of the Invention

The present invention relates broadly to friction liners and other mechanisms for enhancing a transfer of energy, in the form of, for example, torque and momentum, between a stator or other driver component and a rotor or other movable component. More particularly, the present invention concerns a micro-beam friction liner comprising a dense array of micro-beam projections having first ends substantially fixed relative to a rotor and second ends projecting substantially toward a plurality of teeth of a stator, wherein the micro-beam projections compress and bend to store energy during movement of the stator teeth and then react against the stator teeth to convert the stored energy to rotational energy in the rotor.

2. Description of the Prior Art

Generally, a piezoelectric material expands and contracts when an alternating voltage is applied across two opposing surfaces. In a rotary embodiment, a piezoelectric motor comprises a stator and a rotor, with the stator having a plurality of teeth that, due to a traveling wave developed in the stator by piezoelectric action, drives the rotor using elliptic motion of the stator teeth to transfer torque and momentum. Commonly, a friction liner is bonded to the rotor and the rotor and the friction liner are spring-loaded against the stator in order to maximize the transfer of torque and momentum therebetween.

Unfortunately, prior art friction liners are constructed of such materials as hard metals or metal oxides or soft organic polymers, and often experience slippage resulting in significant energy loss and reduced torque transfer. Furthermore, because the tangential velocity of each stator tooth varies at each point on its elliptical path, and because the rotor's velocity can be considered constant during one traversal of the ellipse, the tangential velocity of each stator tooth can only match the rotor velocity at one or two points along the elliptical path. Thus, the majority of contact between the stator tooth and the rotor or the friction liner involves slippage. Additionally, prior art friction liners typically have low Q, or little dynamic action. Such dynamic reaction force/impulse is thought to be one of the mechanisms whereby torque is transferred between the stator and the rotor.

Due to the above-identified and other problems and disadvantages in the art, a need exists for an improved friction liner.

SUMMARY OF THE INVENTION

The present invention overcomes the above-described and other problems and disadvantages in the prior art with a micro-beam friction liner adapted to increase performance and efficiency and reduce wear in a piezoelectric motor or actuator or other device involving a transfer of energy in the form of, for example, torque and momentum. The micro-beam friction liner of the present invention can be incorporated, for example, into an otherwise substantially conventional piezoelectric motor having a stator and a rotor, with the stator including a plurality of teeth. A traveling wave generated in the stator causes each stator tooth to execute a circular or elliptical motion which is to be transferred to the rotor.

In a preferred embodiment, the micro-beam friction liner of the present invention is bonded to or otherwise coupled with the rotor, so as to be interposed between the rotor and the stator teeth. The micro-beam friction liner broadly comprises a dense plurality or array of micro-beam projections, each having a first end fixed relative to the rotor and a second end projecting therefrom substantially toward the stator teeth.

In operation, the second ends of some or all of the plurality of micro-beam projections make contact with the stator teeth moving relative to the rotor during an elliptic traversal. As each stator tooth moves up and tangentially ahead of the rotor, a number of the micro-beam projections contact the stator tooth and are compressed and bent in the direction of rotation. As the stator tooth completes the elliptic path traversal, the micro-beam projections react against the stator tooth to convert energy stored in compression and bending to rotational energy in the rotor.

It will be appreciated that the concept of the micro-beam friction liner can also be expressed as a method of facilitating a transfer of momentum and torque from the stator to the rotor. First the traveling wave is generated through piezoelectric action, with the wave having a certain energy. This energy is then transferred to the micro-beam projections and stored in the form of compression and bending. Lastly, the micro-beam projections react against the stator teeth as they decompress and unbend and thereby transfer the stored energy to the rotor.

Thus, it will be appreciated that the micro-beam friction liner of the present invention provides a number of substantial advantages over the prior art, including, for example, increased performance and efficiency through improved torque transfer, and reduced wear through decreased slippage. Furthermore, the micro-beam friction liner allows for replacement of organic and polymer friction materials used in prior art friction liners with inorganic materials, primarily metals, to further increase friction and wearability. Additionally, the micro-beam friction liner has a high Q, or increased reaction forces, which is believed to play an important role in transferring torque and momentum.

These and other important features of the present invention are more fully described in the section titled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
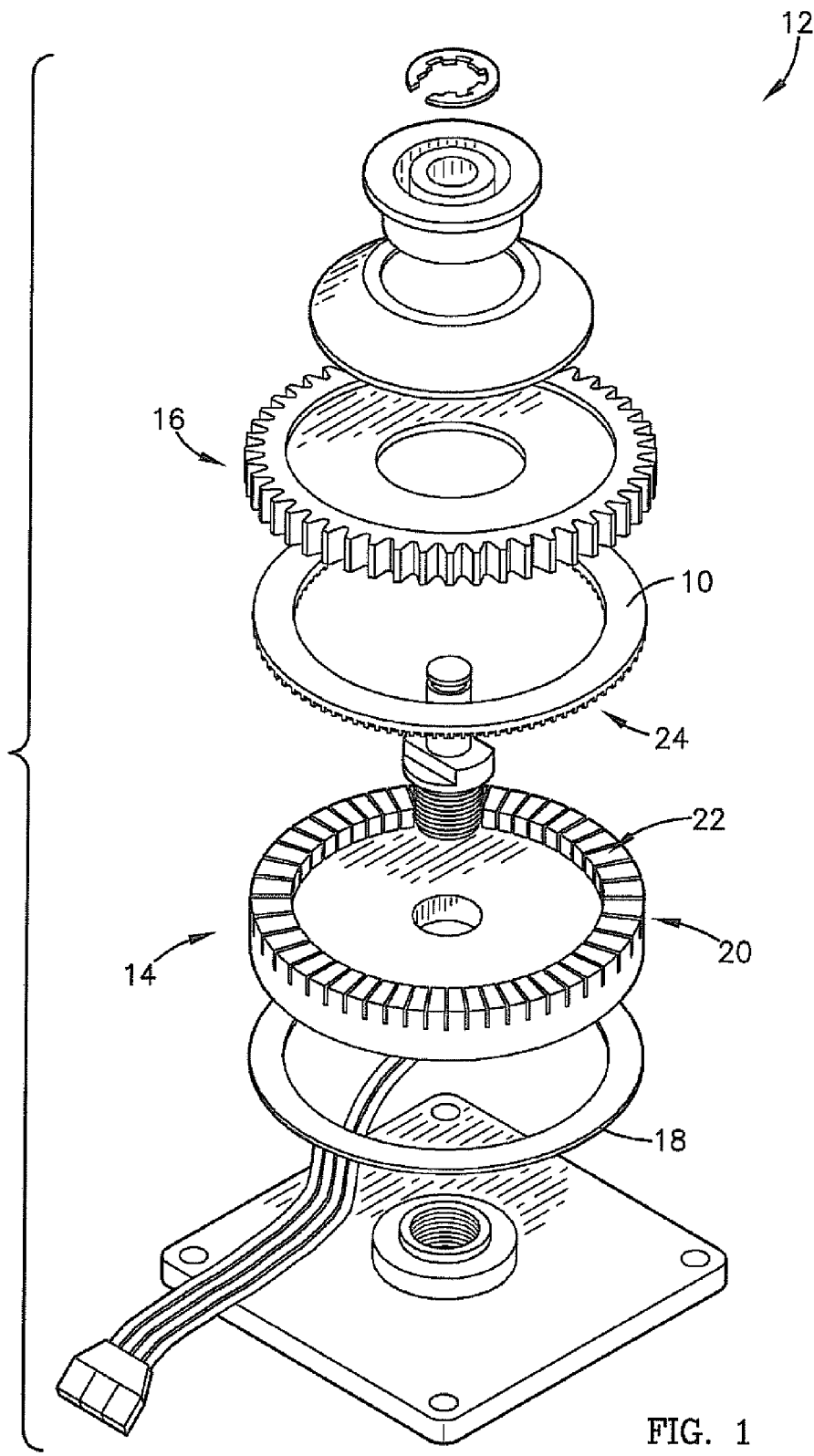
FIG. 1 is an exploded view of a piezoelectric motor incorporating a preferred embodiment of the micro-beam friction liner of the present invention.

Referring to FIG. 1, a micro-beam friction liner 10 is shown constructed in accordance with a preferred first embodiment of the present invention. The micro-beam friction liner 10 is adapted to increase performance and efficiency and reduce wear in a piezoelectric motor 12 or actuator or other device involving a transfer of energy, in the form of, for example, torque and momentum, between a stator 14 or other driver component and a rotor 16 or other movable component.

As illustrated, the piezoelectric motor 12 is substantially conventional in both form and function, and includes the aforementioned stator 14 and rotor 16. The stator 14 includes a piezoelectric ceramic element 18 bonded to a metal ring 20, with the metal ring 20 having a plurality of projecting teeth 22. The rotor 16 may be spring-loaded to enhance contact with the stator 14. Broadly, the piezoelectric element 18 expands and contracts when an alternating voltage is applied across two opposing surfaces. A thin metal electrode is deposited on the piezoelectric element 18 in sections, and each such section is conditioned (poled) such that when the alternating voltage is applied across the entire piezoelectric element 18, one section will expand or contract while adjacent sections correspondingly contract or expand. This results in alternating expansions and contractions that give rise to two standing waves that combine to form a traveling wave. As the wave travels through the stator 14, each stator tooth 22 executes a circular or elliptical motion. It is desirable to transfer to the rotor 16 as much as possible of the energy associated with this circular or elliptical motion. When the applied alternating voltage is at the natural resonant frequency of the metal ring 20, which is typically approximately between 30 kHz and 120 kHz, the elliptical motion movements will be approximately between 50 micro-inches and 400 micro-inches.

Figure 2:
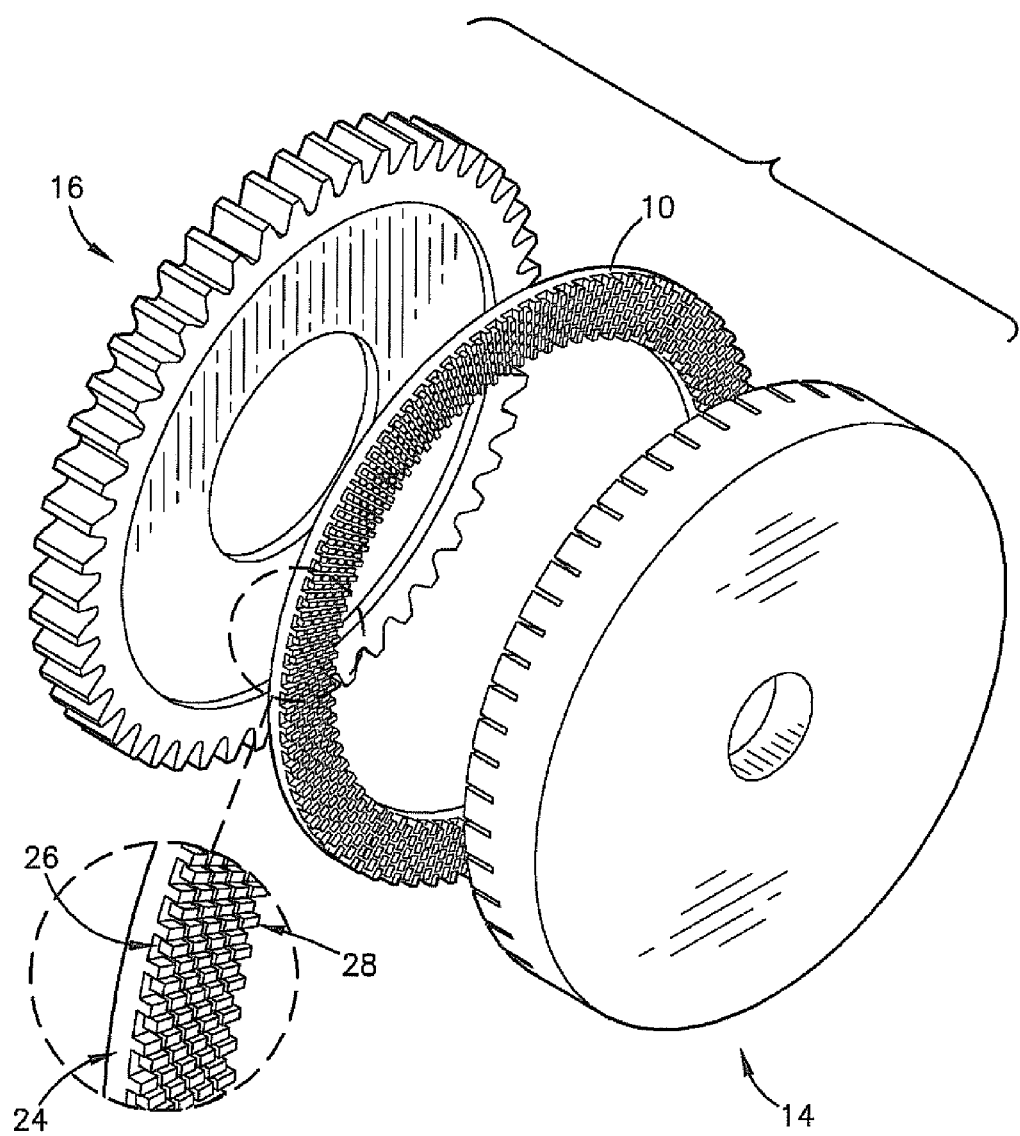
FIG. 2 is a fractional magnified view of a surface of the micro-beam friction liner of FIG. 1 showing a plurality of micro-beam projections.

In a preferred embodiment, referring also to FIG. 2, the micro-beam friction liner 10 of the present invention is interposed between the rotor 16 and the stator teeth 22 to enhance the transfer of energy therebetween. The micro-beam friction liner 10 may be fabricated using polymer materials, including, for example, Teflon, PTFE, PBT, PEEK, and PPS, and may be fiber-reinforced as necessary or desirable. Furthermore, the micro-beam friction liner 10 may be fabricated as a discrete component and then coupled with the rotor 16, such as, for example, by chemical bonding or mechanical fastening, or may be fabricated directly on the rotor 16, such as, for example, by application thereto as a liquid coating.

The micro-beam friction liner 10 broadly comprises a dense plurality or array of micro-beam projections 24, each having a first end 26 substantially fixed relative to the rotor 16 and a second end 28 projecting therefrom substantially toward the stator teeth 22. The second end 28 may be coated with an appropriate friction-enhancing material, such as, for example, a metal oxide (e.g., TiN, $Al_2O_3$, NiP, alumite) or a polymer. Such coating may be accomplished using any suitable process, including, for example, sputtering or plasma spraying.

Design considerations for the micro-beam projections 24 include various material properties, such as, for example, modulus of elasticity and density; physical dimensions and cross-section geometry; stiffness; spacing; number per unit area or ratio to stator tooth area; and array pattern. These considerations may be greatly dependent on application and use. In an 8 mm piezoelectric motor, for example, the micro-beam projections 24 can be fabricated using a LiGA process to have a cross-section of 0.001 inch by 0.0026 inch, a length of 0.0065 inch, and a spacing of 0.001 inch. This results in approximately thirty-six of the micro-beam projections 24 contacting a stator tooth 22 during a contact event. Regardless, however, of the actual design parameters used, it may be preferable that the stator teeth 22 contact an approximately equal number of the micro-beam projections 24 during each contact event so as to avoid a variable torque output.

Another important design consideration is the angle at which the micro-beam projections 24 project toward the stator 14. In a bidirectional motor, the angle of projection is preferably approximately 90° so as to accommodate traveling waves from both forward and reverse directions. In a uni-directional motor, however, wherein the traveling waves move in only one direction, performance may be improved with an angle of projection that is greater or less than 90° in the direction of the traveling waves.

Another important design consideration is resonant frequency. If the resonant frequency of the micro-beam projections 24 is large compared to the stator drive frequency, then the micro-beam projections 24 will respond without lag to movement of the stator teeth 22 and will return to their rest positions prior to the next elliptic traversal. If, however, the resonant frequency of the micro-beam projections 24 is adjusted to synchronize their movements with that of the stator teeth 22, then the micro-beam projections 24 will be optimally positioned for the next elliptic traversal.

Techniques for fabricating the micro-beam projections 24 may depend on the size of the piezoelectric motor 12 into which the micro-beam friction liner 10 is to be incorporated. In large piezoelectric motors, the micro-beam projections 24 may be manufactured using traditional machining methods, such as, for example, mechanical milling, chemical milling/etching, or electrical discharge machining (EDM). In extremely small piezoelectric motors, the micro-beam projections 24 may be manufactured using LiGA or MEMS-type photolithographic processing and micro-EDM processing.

Figure 3:
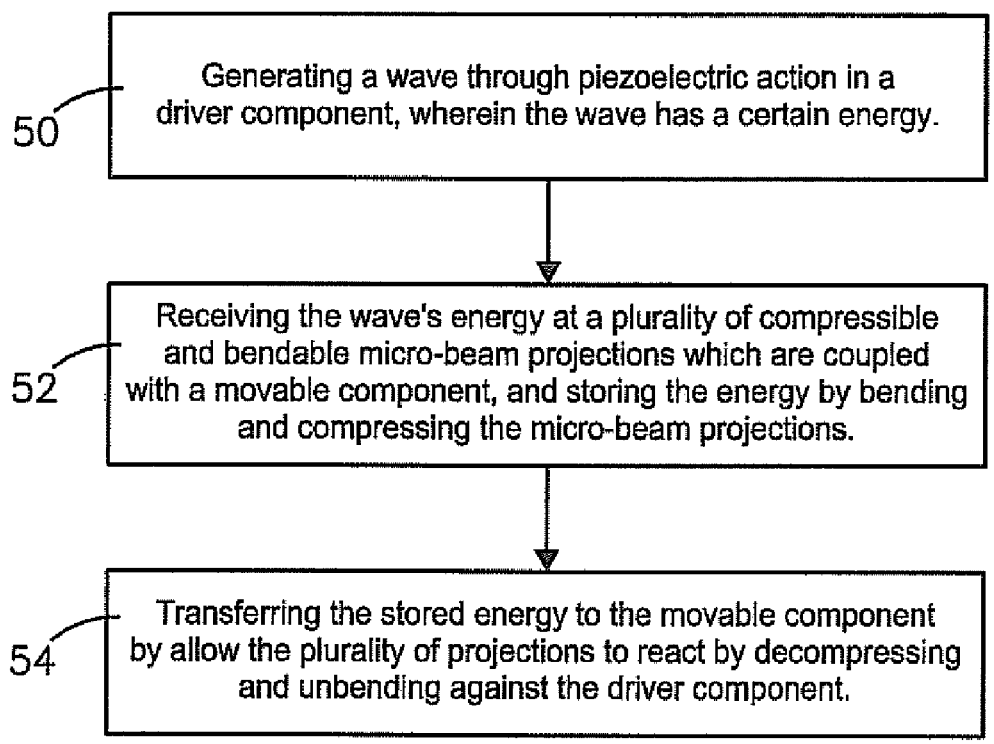
FIG. 3 is a block diagram of preferred steps in the operation of the micro-beam friction liner of FIG. 1.

It will be appreciated that the concept of the micro-beam friction liner 10 can also be characterized and expressed as a method of facilitating a transfer of energy, in the form of, for example, momentum and torque, from the stator 14 to the rotor 16. Referring to FIG. 3, first the wave is generated through piezoelectric action, as depicted in box 50, wherein the wave has a certain energy. Next, the energy of the wave is transferred to and stored in the micro-beam projections 24 in the form of compression and bending, as depicted in box 52. This occurs as the second ends 28 of the plurality of micro-beam projections 24 make contact with the stator teeth 22 moving relative to the rotor 16 during an elliptic traversal, and, as each stator tooth 22 moves up and tangentially ahead of the rotor 16, a number of the micro-beam projections 24 are compressed and bent in the direction of rotation. Lastly, as the stator tooth 22 completes the elliptic path traversal, the micro-beam projections 24 react against the stator tooth 22 as they decompress and unbend and thereby transfer the stored energy to the rotor 16 in the form of momentum and torque, as depicted in box 54.

It will also be appreciated that, although described herein in the context of facilitating the transfer of torque and momentum from elliptical motion caused by traveling waves, the micro-beam friction liner 10 of the present invention may also be used to facilitate a transfer of energy in non-elliptic contact motors, such as, for example, standing wave motors which rely more on impact rather than contact along an elliptical path.

From the preceding description, it will be appreciated that the micro-beam friction liner 10 of the present invention provides a number of substantial advantages over the prior art, including, for example, increased performance and efficiency through improved torque transfer, and reduced wear through decreased slippage. Furthermore, the micro-beam friction liner 10 allows for replacement of organic and polymer friction materials used in prior art friction liners with inorganic materials, primarily metals, to further increase friction and wearability. Additionally, the micro-beam friction liner 10 has a high Q, or increased reaction forces, which is believed to play an important role in transferring torque and momentum.

Although the invention has been described with reference to the preferred embodiments illustrated in the attached drawings, it is noted that equivalents may be employed and substitutions made herein without departing from the scope of the invention as recited in the claims. It will be appreciated, for example, that the micro-beam friction liner of the present invention can be adapted for use in substantially any device that uses traveling or standing waves to transfer energy from a driver to a movable element, including, for example, both linear and rotary piezoelectric motors and actuators.

Having thus described the preferred embodiment of the invention, what is claimed as new and desired to be protected by Letters Patent includes the following:

The invention claimed is:

1. A piezoelectric device comprising:
   a driver component having piezoelectric properties and a plurality of first projections, whereupon application of voltage to the driver component, energy moves through the driver component;
   a movable component adapted to move relative to the driver component;
   a friction liner interposed between the driver component and the movable component and having a dense array of second projections, such that said second projections of the friction liner are oriented towards the first projections of the driver component; and
   at least one of said first projections contacting more than one second projection to thereby transfer the energy from the at least one first projection of the driver component to the more than one second projection of the movable component, resulting in movement of the movable component.

2. The piezoelectric device as set forth in claim 1, wherein the driver component comprises a stator and a piezoelectric element, and the movable component is a rotor.

3. The piezoelectric device as set forth in claim 1, wherein the friction liner is coupled with a surface of the movable component.

4. The piezoelectric device as set forth in claim 1, wherein the friction liner is adapted to facilitate transferring momentum and torque from the driver component to the movable component.

5. The piezoelectric device as set forth in claim 1, wherein the second projections are adapted to bend and compress in response to the wave in the driver component, thereby transferring energy to the movable component.

6. The piezoelectric device as set forth in claim 1, wherein the second projections are oriented to project perpendicularly from the movable component toward the driver component.

7. The piezoelectric device as set forth in claim 1, wherein the second projections are oriented to project non-perpendicularly from the movable component toward the driver component.

8. A piezoelectric device comprising:
   a stator having piezoelectric properties and a plurality of first projections;
   a rotor adapted to move relative to the stator; and
   a friction liner interposed between the stator and the rotor and having a dense array of second projections,
   said dense array including a plurality of rows, each row oriented generally perpendicular to an outer circumference of the liner and further including a plurality of projections.

9. The piezoelectric device as set forth in claim 8, wherein said first projections are oriented towards said second projections.

10. The piezoelectric device as set forth in claim 9, wherein at least one first projection contacts more than one second projection.

11. The piezoelectric device as set forth in claim 10, wherein upon each contact event, each first projection contacts a certain number of second projections, such that the certain number of second projections contacted by each first projection is approximately equal.

12. The piezoelectric device as set forth in claim 1, wherein upon each contact event, each first projection contacts a certain number of second projections, such that the certain number of second projections contacted by each first projection is approximately equal.

* * * * *